US012641629B2

(12) United States Patent
Deenoo et al.

(10) Patent No.: US 12,641,629 B2
(45) Date of Patent: May 26, 2026

(54) METHODS, APPARATUS, AND SYSTEMS FOR ARTIFICIAL INTELLIGENCE (AI)-ENABLED FILTERS IN WIRELESS SYSTEMS

(71) Applicant: InterDigital Patent Holdings, Inc., Wilmington, DE (US)

(72) Inventors: Yugeswar Deenoo, Chalfont, PA (US); Ghyslain Pelletier, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 550 days.

(21) Appl. No.: 18/032,476

(22) PCT Filed: Oct. 19, 2021

(86) PCT No.: PCT/US2021/055641
§ 371 (c)(1),
(2) Date: Apr. 18, 2023

(87) PCT Pub. No.: WO2022/086984
PCT Pub. Date: Apr. 28, 2022

(65) Prior Publication Data
US 2023/0389057 A1     Nov. 30, 2023

Related U.S. Application Data

(60) Provisional application No. 63/094,496, filed on Oct. 21, 2020.

(51) Int. Cl.
*H04W 72/50* (2023.01)
*G06N 3/0455* (2023.01)
*G06N 3/084* (2023.01)

(52) U.S. Cl.
CPC .......... *H04W 72/50* (2023.01); *G06N 3/0455* (2023.01); *G06N 3/084* (2013.01)

(58) Field of Classification Search
CPC .... H04L 1/0009; H04L 1/0019; H04W 72/50; H04W 72/542; G06N 20/10;
(Continued)

(56) References Cited

U.S. PATENT DOCUMENTS

2021/0049451 A1    2/2021    Wang et al.
2021/0064996 A1    3/2021    Wang et al.
(Continued)

FOREIGN PATENT DOCUMENTS

KR          20200017611 A      2/2020
WO      WO 2020068127 A1      4/2020
(Continued)

OTHER PUBLICATIONS

International Search Report for PCT/US2021/055641 dated Feb. 23, 2022.
(Continued)

*Primary Examiner* — Boubacar Abdou Tchoussou
(74) *Attorney, Agent, or Firm* — Majid Albassam

(57)          ABSTRACT

Methods, apparatus and systems are disclosed. One method may include a wireless transmit/receive unit (WTRU) receiving a transmission including a data unit (DU) on a first set of resources. The WTRU may select an artificial intelligence (AI) filter based on the first set of resources and input the DU or a part of the DU to the selected AI filter. The WTRU may perform AI filtering on the inputted DU or part thereof to output any of: a set of AI-based transmission parameters or an AI-processed DU. The AI-processed DU may include: a first portion of the DU processed by the AI filter and a second portion of the DU processed by a rule-based component, or the DU processed by the AI filter. The WTRU may transmit any of: the AI-processed DU using a set of rule-based transmission parameters, or a rule-based DU using the AI-based transmission parameters.

28 Claims, 7 Drawing Sheets

*Input*: PDU, link conditions, contextual info
*Output*: transmission profile,
next hop, sidelink resources, link adaptation

AI filter for Dynamic forwarding/relaying

(58) Field of Classification Search
CPC ...... G06N 3/006; G06N 3/044; G06N 3/0442;
G06N 3/045; G06N 3/0455; G06N 3/047;
G06N 3/084; G06N 3/0895; G06N 3/09;
G06N 3/092
See application file for complete search history.

(56) References Cited

U.S. PATENT DOCUMENTS

| | | | |
|---|---|---|---|
| 2023/0231653 A1* | 7/2023 | Shin | H04L 1/0075 |
| | | | 370/252 |
| 2023/0299872 A1* | 9/2023 | Xu | G06N 3/045 |
| | | | 370/328 |

FOREIGN PATENT DOCUMENTS

| | | |
|---|---|---|
| WO | WO 2021126907 A1 | 6/2021 |
| WO | WO 2021142637 A1 | 7/2021 |

OTHER PUBLICATIONS

3rd Generation Partnership Project, "Technical Specification Group Radio Access Network; NR; Medium Access Control (MAC) protocol specification (Release 16)," 3GPP TS 38.321 V16.0.0 (Mar. 2020).

3rd Generation Partnership Project, "Technical Specification Group Radio Access Network; NR; Physical ayer procedures for data (Release 16)," 3GPP TS 38.214 v16.0.0 (Dec. 2019).

3rd Generation Partnership Project, "Technical Specification Group Radio Access Network, NR; Radio Resource Control (RRC) protocol specification (Release 16)," 3GPP TS 38.331 V16.0.0 (Mar. 2020).

Nguyen, Dinh C., et al., "Enabling AI in Future Wireless Networks: A Data Life Cycle Perspective", Accepted at IEEE Communications Surveys & Tutorials (Apr. 27, 2021) 42 pages.

"New SID: Study on NR sidelink relay", 3GPP Tdoc RP-193253, 3GPP TSG RAN Meeting #86 (revision of RP-193118); Sitges, Spain, Dec. 9-12, 2019.

* cited by examiner

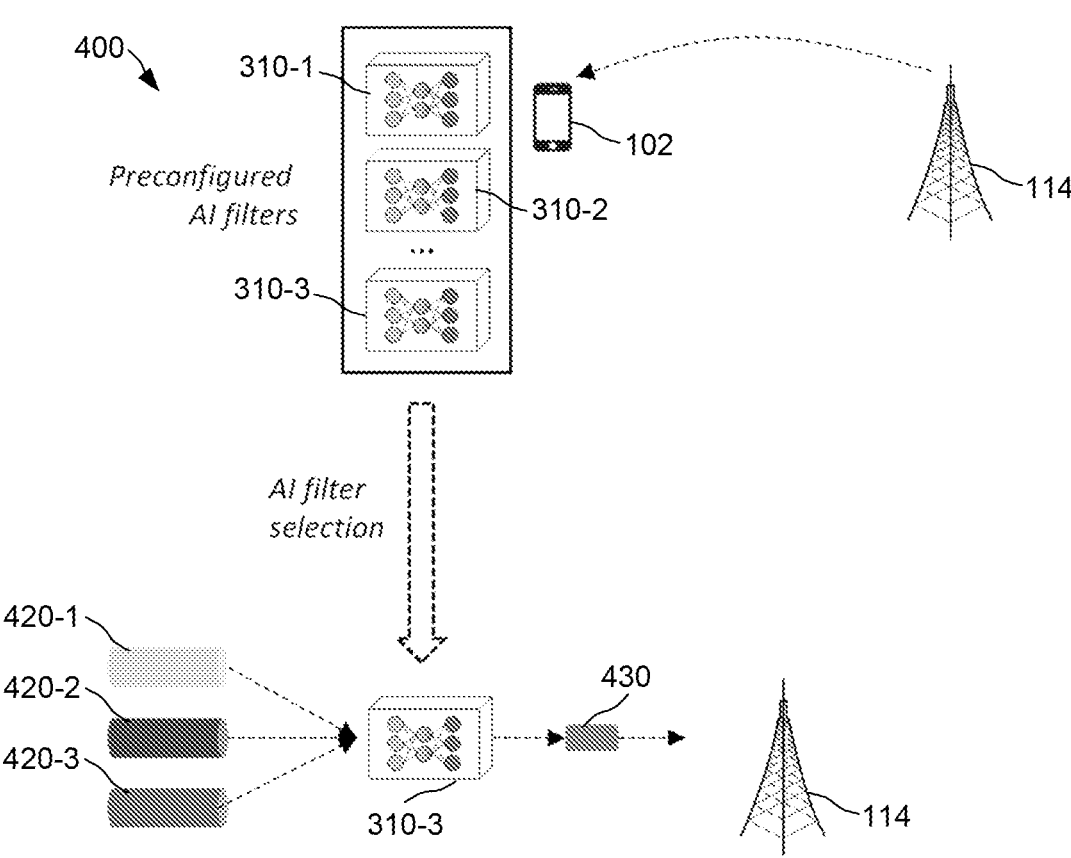
Input: PDU, LCID, meta info, contextual info, link conditions
Output: transmission profile,
link adaptation, PDU applicable transmission post LCP
FIG. 4:  AI filter per packet QoS treatment
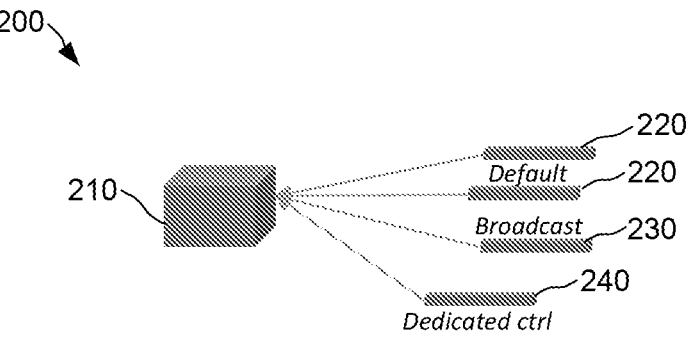
FIG. 2: Incremental AI model update

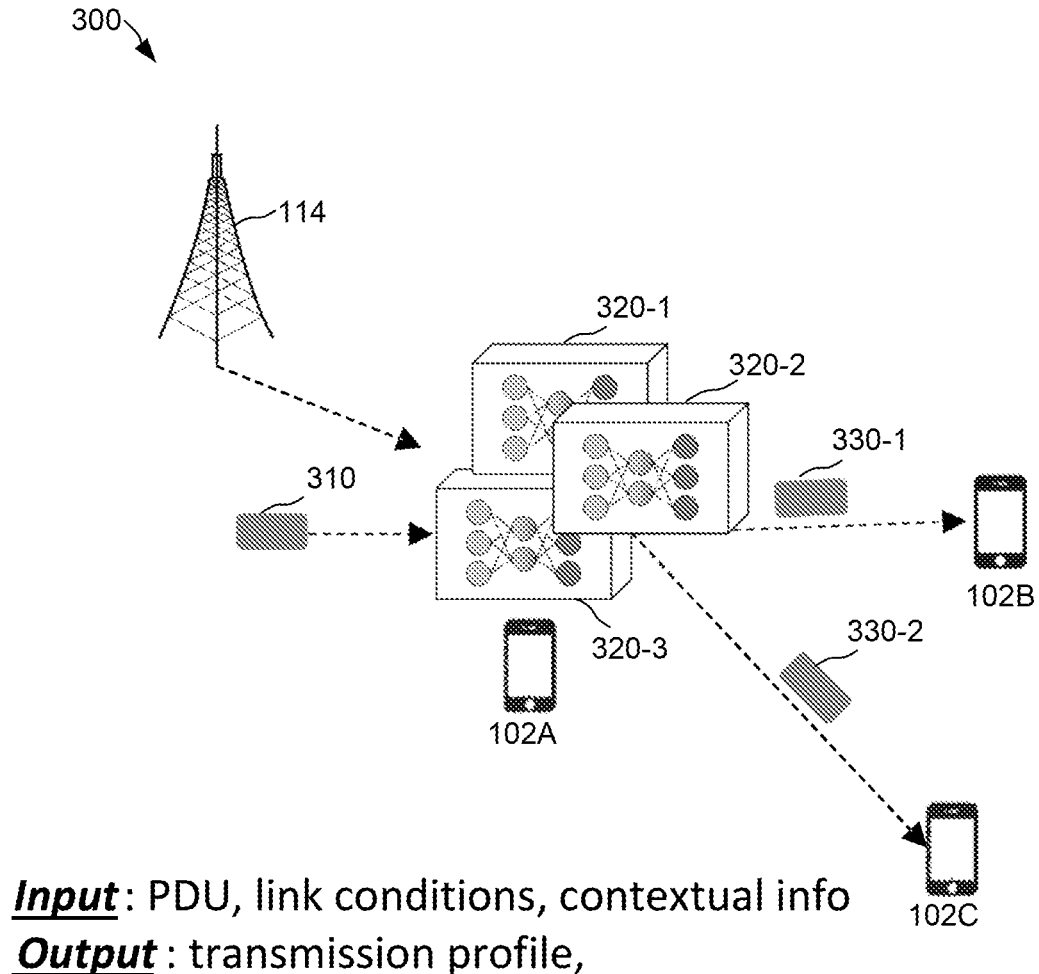
_Input_: PDU, link conditions, contextual info
_Output_: transmission profile,
next hop, sidelink resources, link adaptation
FIG. 3: AI filter for Dynamic forwarding/relaying

Figures 5, 6:
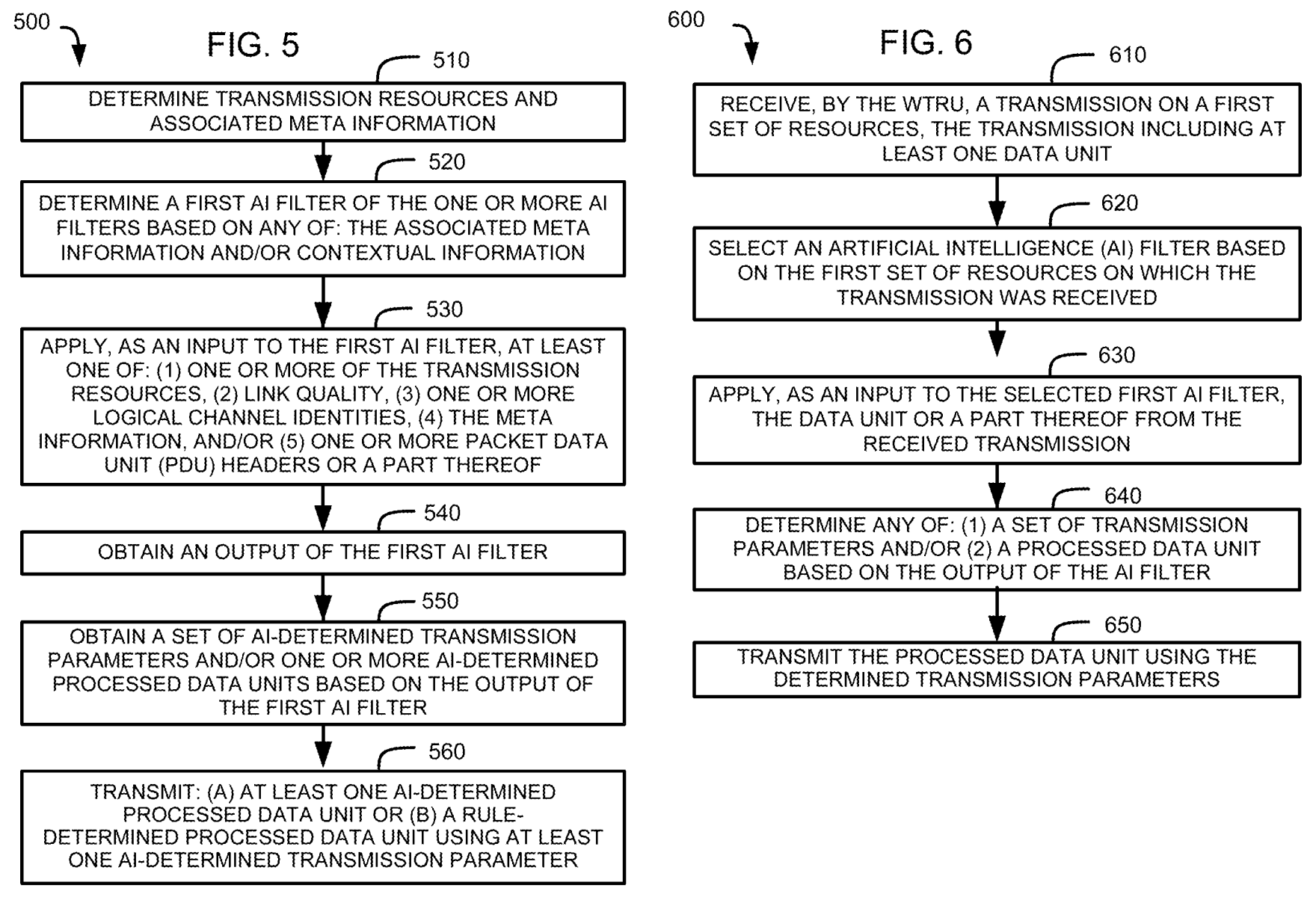

610 — RECEIVE, BY THE WTRU, A TRANSMISSION ON A FIRST SET OF RESOURCES, THE TRANSMISSION INCLUDING AT LEAST ONE DATA UNIT

620 — SELECT AN ARTIFICIAL INTELLIGENCE (AI) FILTER BASED ON THE FIRST SET OF RESOURCES ON WHICH THE TRANSMISSION WAS RECEIVED

630 — APPLY, AS AN INPUT TO THE SELECTED FIRST AI FILTER, THE DATA UNIT OR A PART THEREOF FROM THE RECEIVED TRANSMISSION

640 — DETERMINE ANY OF: (1) A SET OF TRANSMISSION PARAMETERS AND/OR (2) A PROCESSED DATA UNIT BASED ON THE OUTPUT OF THE AI FILTER

650 — TRANSMIT THE PROCESSED DATA UNIT USING THE DETERMINED TRANSMISSION PARAMETERS

510 — DETERMINE TRANSMISSION RESOURCES AND ASSOCIATED META INFORMATION

520 — DETERMINE A FIRST AI FILTER OF THE ONE OR MORE AI FILTERS BASED ON ANY OF: THE ASSOCIATED META INFORMATION AND/OR CONTEXTUAL INFORMATION

530 — APPLY, AS AN INPUT TO THE FIRST AI FILTER, AT LEAST ONE OF: (1) ONE OR MORE OF THE TRANSMISSION RESOURCES, (2) LINK QUALITY, (3) ONE OR MORE LOGICAL CHANNEL IDENTITIES, (4) THE META INFORMATION, AND/OR (5) ONE OR MORE PACKET DATA UNIT (PDU) HEADERS OR A PART THEREOF

540 — OBTAIN AN OUTPUT OF THE FIRST AI FILTER

550 — OBTAIN A SET OF AI-DETERMINED TRANSMISSION PARAMETERS AND/OR ONE OR MORE AI-DETERMINED PROCESSED DATA UNITS BASED ON THE OUTPUT OF THE FIRST AI FILTER

560 — TRANSMIT: (A) AT LEAST ONE AI-DETERMINED PROCESSED DATA UNIT OR (B) A RULE-DETERMINED PROCESSED DATA UNIT USING AT LEAST ONE AI-DETERMINED TRANSMISSION PARAMETER

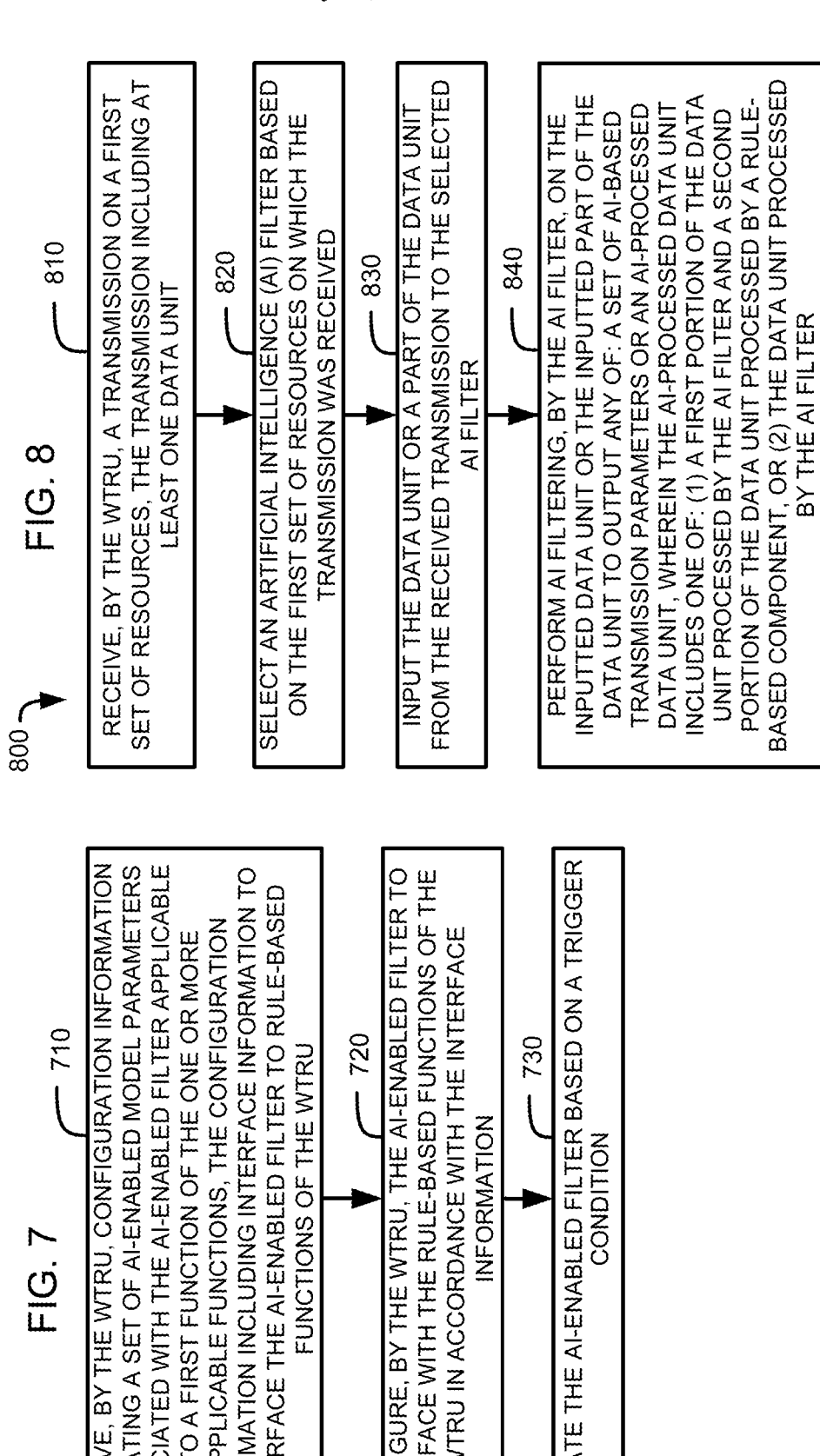

810 — RECEIVE, BY THE WTRU, A TRANSMISSION ON A FIRST SET OF RESOURCES, THE TRANSMISSION INCLUDING AT LEAST ONE DATA UNIT

820 — SELECT AN ARTIFICIAL INTELLIGENCE (AI) FILTER BASED ON THE FIRST SET OF RESOURCES ON WHICH THE TRANSMISSION WAS RECEIVED

830 — INPUT THE DATA UNIT OR A PART OF THE DATA UNIT FROM THE RECEIVED TRANSMISSION TO THE SELECTED AI FILTER

840 — PERFORM AI FILTERING, BY THE AI FILTER, ON THE INPUTTED DATA UNIT OR THE INPUTTED PART OF THE DATA UNIT TO OUTPUT ANY OF: A SET OF AI-BASED TRANSMISSION PARAMETERS OR AN AI-PROCESSED DATA UNIT, WHEREIN THE AI-PROCESSED DATA UNIT INCLUDES ONE OF: (1) A FIRST PORTION OF THE DATA UNIT PROCESSED BY THE AI FILTER AND A SECOND PORTION OF THE DATA UNIT PROCESSED BY A RULE-BASED COMPONENT, OR (2) THE DATA UNIT PROCESSED BY THE AI FILTER

850 — TRANSMIT, BY THE WTRU, ANY OF: (1) THE AI-PROCESSED DATA UNIT USING A SET OF RULE-BASED TRANSMISSION PARAMETERS, OR (2) A RULE-BASED DATA UNIT USING THE AI-BASED TRANSMISSION PARAMETERS

710 — RECEIVE, BY THE WTRU, CONFIGURATION INFORMATION INDICATING A SET OF AI-ENABLED MODEL PARAMETERS ASSOCIATED WITH THE AI-ENABLED FILTER APPLICABLE TO A FIRST FUNCTION OF THE ONE OR MORE APPLICABLE FUNCTIONS, THE CONFIGURATION INFORMATION INCLUDING INTERFACE INFORMATION TO INTERFACE THE AI-ENABLED FILTER TO RULE-BASED FUNCTIONS OF THE WTRU

720 — CONFIGURE, BY THE WTRU, THE AI-ENABLED FILTER TO INTERFACE WITH THE RULE-BASED FUNCTIONS OF THE WTRU IN ACCORDANCE WITH THE INTERFACE INFORMATION

730 — ACTIVATE THE AI-ENABLED FILTER BASED ON A TRIGGER CONDITION

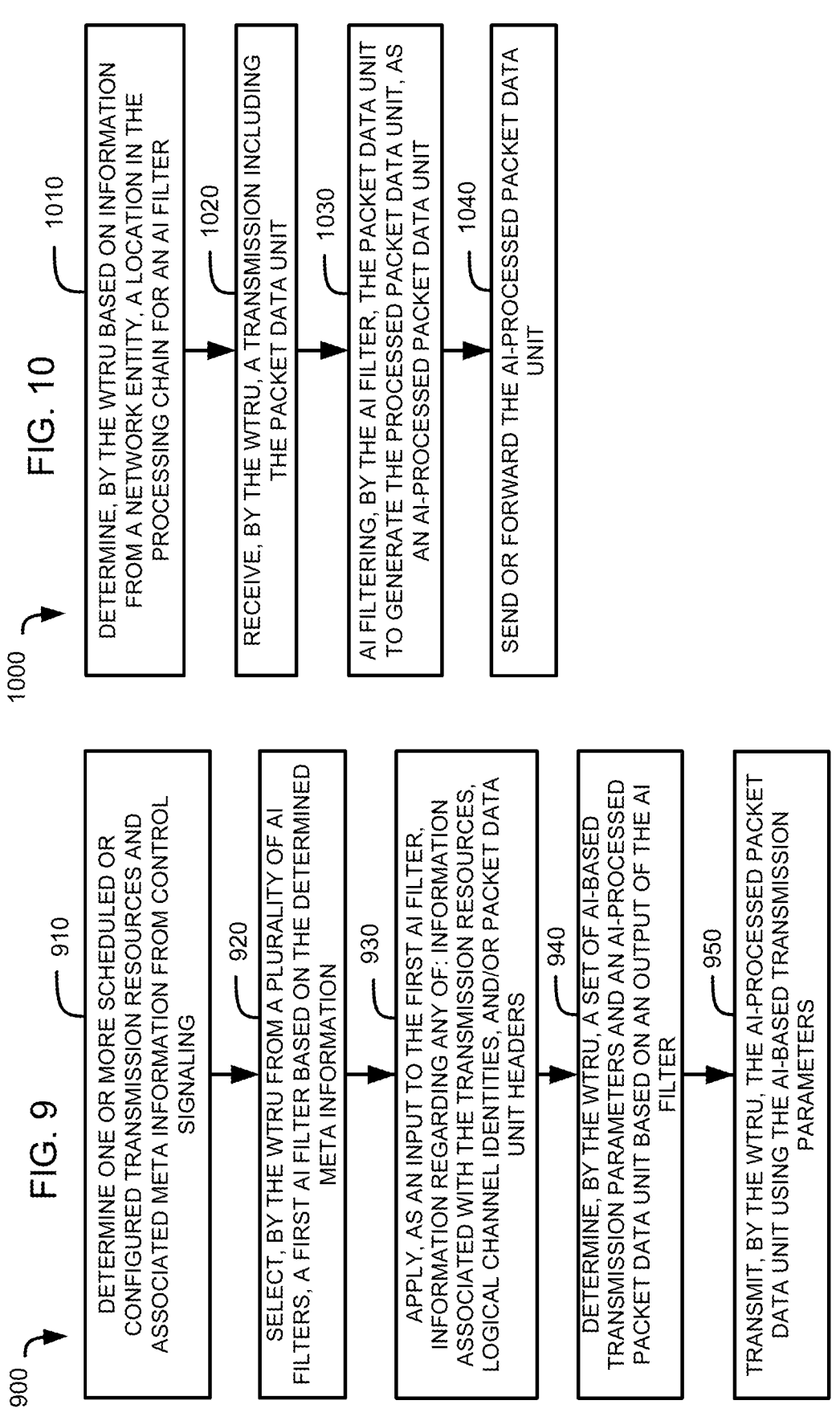

1010 — DETERMINE, BY THE WTRU BASED ON INFORMATION FROM A NETWORK ENTITY, A LOCATION IN THE PROCESSING CHAIN FOR AN AI FILTER

1020 — RECEIVE, BY THE WTRU, A TRANSMISSION INCLUDING THE PACKET DATA UNIT

1030 — AI FILTERING, BY THE AI FILTER, THE PACKET DATA UNIT TO GENERATE THE PROCESSED PACKET DATA UNIT, AS AN AI-PROCESSED PACKET DATA UNIT

1040 — SEND OR FORWARD THE AI-PROCESSED PACKET DATA UNIT

910 — DETERMINE ONE OR MORE SCHEDULED OR CONFIGURED TRANSMISSION RESOURCES AND ASSOCIATED META INFORMATION FROM CONTROL SIGNALING

920 — SELECT, BY THE WTRU FROM A PLURALITY OF AI FILTERS, A FIRST AI FILTER BASED ON THE DETERMINED META INFORMATION

930 — APPLY, AS AN INPUT TO THE FIRST AI FILTER, INFORMATION REGARDING ANY OF: INFORMATION ASSOCIATED WITH THE TRANSMISSION RESOURCES, LOGICAL CHANNEL IDENTITIES, AND/OR PACKET DATA UNIT HEADERS

940 — DETERMINE, BY THE WTRU, A SET OF AI-BASED TRANSMISSION PARAMETERS AND AN AI-PROCESSED PACKET DATA UNIT BASED ON AN OUTPUT OF THE AI FILTER

950 — TRANSMIT, BY THE WTRU, THE AI-PROCESSED PACKET DATA UNIT USING THE AI-BASED TRANSMISSION PARAMETERS

METHODS, APPARATUS, AND SYSTEMS FOR ARTIFICIAL INTELLIGENCE (AI)-ENABLED FILTERS IN WIRELESS SYSTEMS

CROSS REFERENCE

This application is a U.S. National Stage Application under 35 U.S.C. 371 of International Patent Application No. PCT/US2021/055641, filed Oct. 19, 2021, which is incorporated herein by reference in its entirety. This application claims the benefit of U.S. Provisional Application No. 63/094,496, filed Oct. 21, 2020, which is incorporated herein by reference in its entirety.

FIELD

Embodiments disclosed herein generally relate to wireless communications and, for example to methods, apparatus and systems for AI-enabled Filters.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

Figures 1A, 1C:
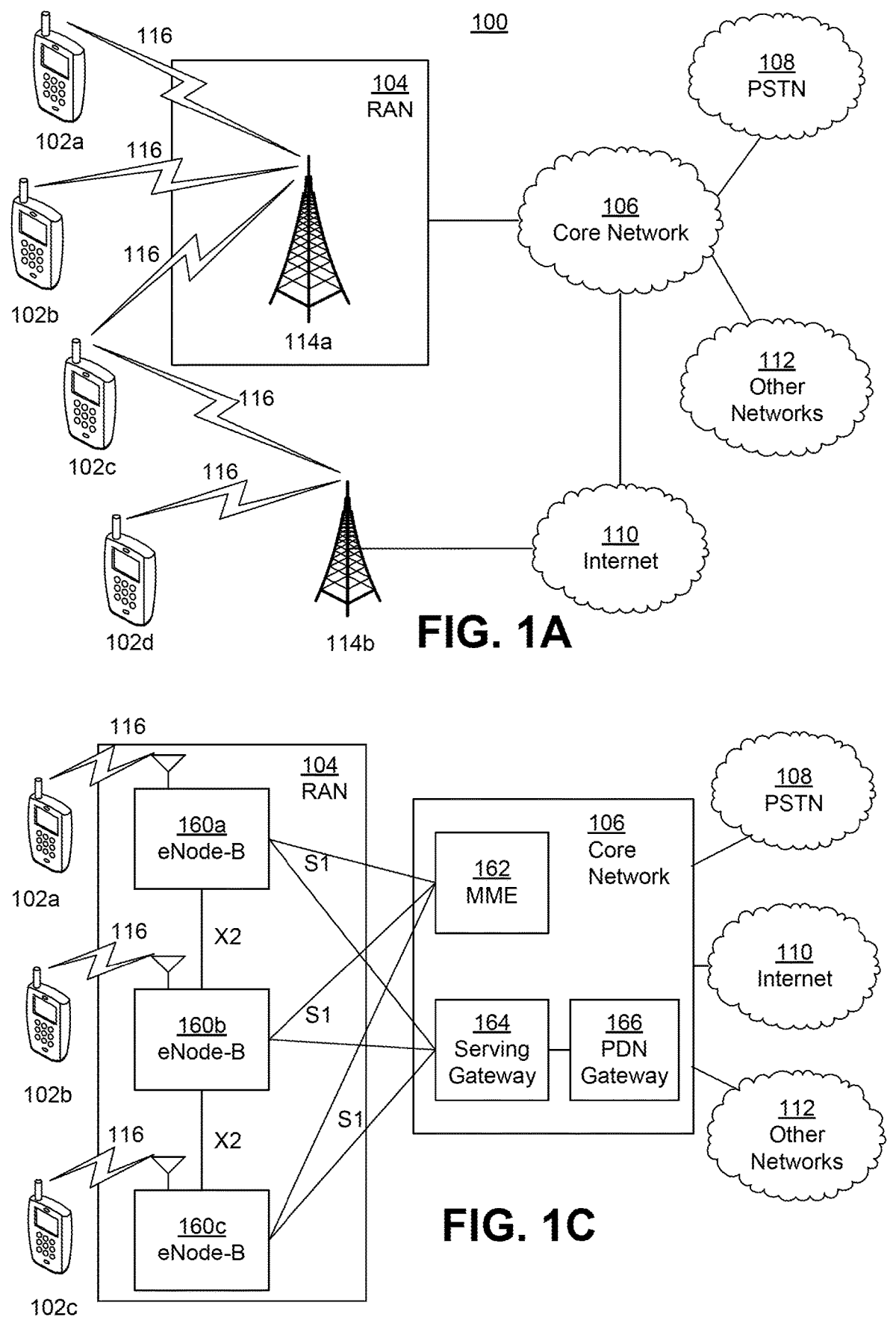

FIG. 1A is a system diagram illustrating an example communications system in which one or more disclosed embodiments may be implemented;

FIG. 1C is a system diagram illustrating an example radio access network (RAN) and an example core network (CN) that may be used within the communications system illustrated in FIG. 1A according to an embodiment;

FIG. 2 is a diagram illustrating a representative procedure for updating an AI model (e.g., to incrementally update an AI model);

FIG. 3 is a diagram illustrating a representative procedure for dynamic forwarding/relaying using an AI filter;

FIG. 4 is a diagram illustrating a representative procedure using an AI filter per packet QoS treatment;

FIG. 5 is a flowchart illustrating a representative method using one or more Artificial Intelligence (AI) filters;

FIG. 6 is a flowchart illustrating a representative method implemented by a WTRU.

FIG. 7 is a flowchart illustrating a representative method using an AI-enabled filter applicable for one or more functions;

FIG. 8 is a flowchart illustrating another representative method implemented by a WTRU;

FIG. 9 is a flowchart illustrating a further representative method implemented by a WTRU; and FIG. 10 is a flowchart illustrating an additional representative method implemented by a wireless transmit/receive unit (WTRU).

DETAILED DESCRIPTION

Figures 1B, 1D:
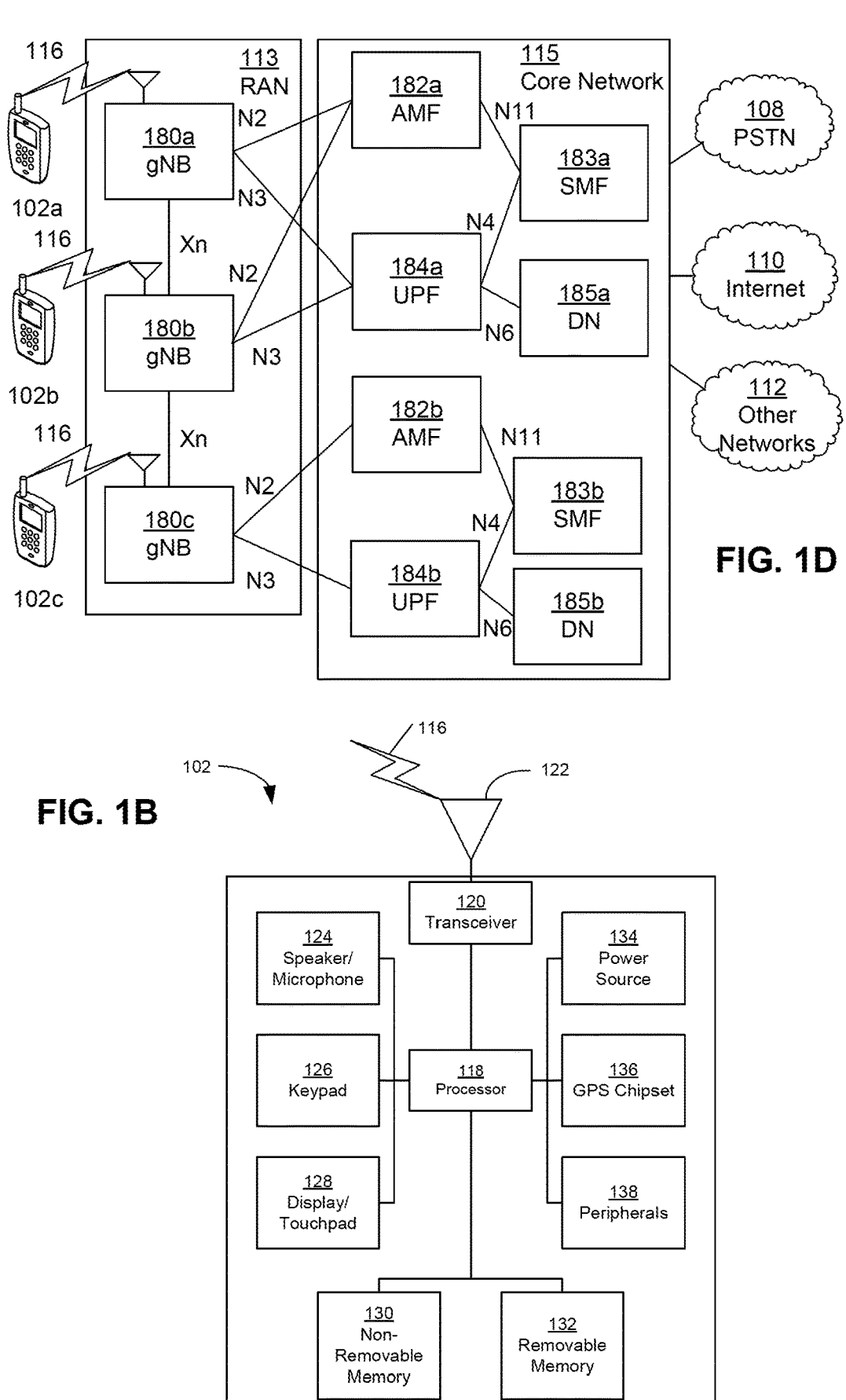
FIG. 1B is a system diagram illustrating an example wireless transmit/receive unit (WTRU) that may be used within the communications system illustrated in FIG. 1A according to an embodiment.
FIG. 1D is a system diagram illustrating a further example RAN and a further example CN that may be used within the communications system illustrated in FIG. 1A according to an embodiment.

Example Networks for Implementation of the Embodiments

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (end), a Home Node B (HNB), a Home eNode B (HeNB), a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an end and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114*b*, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and/or receive wireless signals from, the WTRU 102a.

Each of the eNode Bs 160a, 160b, 160c may be associated with a particular cell (not shown) and may be configured to handle radio resource management decisions, handover decisions, scheduling of users in the UL and/or DL, and the like. As shown in FIG. 10, the eNode Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode Bs 160a, 160b, 160c. For example, WTRUs 102a, 102b, 102c may implement DC principles to communicate with one or more gNBs 180a, 180b, 180c and one or more eNode Bs 160a, 160b, 160c substantially simultaneously. In the non-standalone configuration, eNode Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different Protocol Data Unit (PDU)

sessions with different requirements), selecting a particular SMF 183*a*, 183*b*, management of the registration area, termination of Non-Access Stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WTRU may be configured with AI-enabled filters applicable to one or more functions of a protocol stack (e.g., as defined by [INPUT, OUTPUT, filter]).

For example, a WTRU may receive signaling that indicate any of: (1) an entry point of a filter, (2) initial values/parametrization for the filter, and/or (3) an exit point of the filter. In certain representative embodiments, activation of a filter may be a configuration aspect of the WTRU.

A WTRU configured with one or more Artificial Intelligence (AI) filters (e.g., which may be acquired via unicast, broadcast and/or multicast transmissions) may perform any of: (1) receiving a first transmission (e.g., a data unit) on a first set of resources, (2) selecting an AI filter as a function of resources on which the first transmission was received, (3) applying the data unit to be processed for transmission (e.g., a PDU) or one or more parts thereof as an input to the selected AI filter, (4) determining a set of transmission parameters and/or the processed data unit based on an output of the AI filter, and/or (5) transmitting the processed data unit using the determined set of transmission parameters.

A WTRU configured with one or more AI filters (e.g., which may be acquired via unicast, broadcast and/or multicast transmissions) may perform any of: (1) determining one or more transmission resources (e.g., which may be scheduled and/or configured) and associated meta information, (2) determining a first AI filter based on the meta information, (3) applying, as an input to the first AI filter, any of: the determined transmission resources, logical channel identities, PDU headers and/or parts thereof; (4) determining a set of transmission parameters and/or the processed data unit based on the output of the AI filter, and/or (5) transmitting the processed data unit using the determined set of transmission parameters.

In certain representative embodiments, a configurable, variable number of AI-based modules (e.g., in parallel, cascaded or not cascaded) may be implemented in a protocol/processing chain of one or more functions that may e.g., be controlled semi-statically and/or dynamically by a network entity.

In certain representative embodiments, a WTRU may be configured with one or more AI filters (for example or possibly acquired via unicast, broadcast or multicast transmissions). The WTRU may be configured to receive a transmission (e.g. a data unit) on a first set of resources. The WTRU may select an AI filter as a function of resources on which a first transmission was received and apply the data unit to be processed for transmission (e.g., a PDU) or parts thereof as an input to the selected AI filter. The WTRU may be configured to determine a set of transmission parameters and/or processed data unit based on the output of the AI filter and transmit the processed data unit using the transmission parameters.

In certain representative embodiments, a WTRU may be configured with one or more AI filters (for example or possibly acquired via unicast, broadcast and/or multicast transmissions). The WTRU may be configured to determine transmission resources (e.g. scheduled, and/or configured) and associated meta information, and determine a first AI filter based on meta information. The WTRU may be configured to apply, as an input to the first AI filter, the transmission resources, logical channel identities, PDU headers or parts thereof, determine a set of transmission parameters and/or a processed data unit based on the output of the AI filter and transmit the processed data unit using the transmission parameters.

In certain representative embodiments, hardware, software and/or other means may be implemented to configure and/or control protocol functions using a parallel or cascading of rule-based components (e.g., legacy rule-based components) and AI components. The AI components may be trained to perform/learn complex mapping/filtering functions that are otherwise too complicated to specify/control and/or implement. Using network controlled AI components in the processing chain of a WTRU may enable interoperable and/or dynamic adaptation of properties associated with protocol functions based on different contexts (e.g., channel condition, quality of service, WTRU power saving, cell load, interference, and/or WTRU/NW capability, among others).

Embodiments disclosed herein are representative and do not limit the applicability of the apparatus, procedures, functions and/or methods to any particular wireless technology, any particular communication technology and/or other technologies. The term network in this disclosure may generally refer to one or more gNBs or other network entity which in turn may be associated with one or more Transmission/Reception Points (TRPs), or to any other node in the radio access network.

Artificial Intelligence (AI) may be broadly defined as behaviors exhibited by machines that mimics cognitive functions to sense, reason, adapt and/or act.

Representative Procedures for Machine Learning (ML)

Machine learning may refer to a type of algorithm that may solve a problem based on learning through experience (data), without explicitly being programmed (e.g., via 'configuring set of rules'). Machine learning can be considered as a subset of AI. Different machine learning paradigms may be envisioned based on the nature of data or feedback available to the learning algorithm. For example, a supervised learning approach may involve learning a function that maps input to an output based on labeled training examples. Each training example may be a pair consisting of input and the corresponding output. For example, an unsupervised learning approach may involve detecting patterns in the data with no pre-existing labels. For example, a reinforcement learning approach may involve performing a sequence of actions in an environment to maximize the cumulative reward. In some examples, machine learning algorithms may be implemented using a combination or an interpolation of the above mentioned approaches. For example, a semi-supervised learning approach may use a combination of a small amount of labeled data with a large amount of unlabeled data during training. Semi-supervised learning (e.g., with both labeled and unlabeled data) falls between unsupervised learning (e.g., with no labeled training data) and supervised learning (e.g., with only labeled training data).

Representative Procedures for Deep Learning (DL)

Deep learning generally refers to a class of machine learning algorithms that employ artificial neural networks (for example Deep Neural Networks (DNNs) which were loosely inspired from biological systems. The Deep Neural Networks (DNNs) are a special class of machine learning models inspired by the human brain. The input may be linearly transformed and pass through one or more non-linear activation functions one or multiple times. The DNNs typically consist of multiple layers. Each layer may consist of a linear transformation and one or more given non-linear activation functions. The DNNs can be trained using training data via a back-propagation algorithm. DNNs have shown state-of-the-art performance in variety of domains, e.g., speech, vision, natural language etc. and for various machine learning settings (e.g., supervised, un-supervised, and/or semi-supervised). An AI component may generally refer to realization of one or more behaviors and/or conformance to requirements by learning based on data, without an explicit configuration of sequence of steps/operations of actions. The AI component may enable learning complex behaviors which might be difficult to specify and/or implement when using legacy operations/methods.

Representative Auto-Encoders

Auto-encoders are a specific class of DNNs that arise in the context of un-supervised machine learning setting in which high-dimensional data is non-linearly transformed to a lower dimensional latent vector using a DNN based encoder and the lower dimensional latent vector is then used to re-produce the high-dimensional data using a non-linear decoder. The encoder may be represented as $E(x; W_e)$ where x is the high-dimensional data and $W_e$ represents the parameters of the encoder. The decoder may be represented as $D(z; W_d)$ where z is a low-dimensional latent representation and $W_d$ represents the parameters of the encoder. Using training data $\{x_1, \ldots, x_N\}$ the auto-encoder can be trained by solving the following optimization problem:

$$\{W_e^{tr}, W_d^{tr}\} = \arg \min_{W_e, W_d} \sum_{i=1}^{N} \|x_i - D(E(x_i; W_e); W_d)\|_2^2.$$

The above problem may be approximately solved using a backpropagation algorithm. The trained encoder $$E(x; W_e^{tr})$$

may be used to compress the high-dimensional data and the trained decoder $$D(z; W_d^{tr})$$

may be used to decompress the latent representation.

The terms "Artificial Intelligence" (AI), "Machine Learning" (ML), "Deep Learning" (DL), and "DNNs" may be used interchangeably. Apparatus, operations, procedures and methods described herein are examples using and/or based on (e.g., learning in) wireless communication systems, but are not limited to such scenarios, systems and services and may be applicable to any type of transmissions, communication systems and/or services, among others.

Representative Procedures for Recurrent Neural Networks (RNNs)

RNNs may be algorithms that are effective (e.g., specifically effective) in modeling sequential data. RNNs include or contain internal memory that may enable the model to remember previous inputs and current inputs to help sequence modelling. The output for any step/operation within the neural network does not or may not only depend on the current input, but may also depend on the output generated at one or more previous steps/operations. While probably somewhat impractical in terms of training complexity, RNNs can enable a neural network to track evolving conditions for a given task (e.g., in terms of tracking an impact of or changes in any of: (1) one or more channel conditions, (2) one or more radio conditions, (3) latency, (4) bitrate, and/or (5) jitter, among others) (e.g., for a determination of how to apply QoS treatment on a per packet basis for a given flow, or the like).

Representative Procedures for Logical Channel Prioritization (LCP)

LTE and NR define rule-based functions (e.g., that are based on a set of rules, behaviors and terminal requirements) referred to as Logical Channel Prioritization (LCP). A WTRU may perform LCP to determine what data to multiplex and include in a transport block (TB) for a given transmission of a given size. LCP may typically be parametrized using any of (1) Priority, (2) Prioritized Bit Rate (PBR), (3) Bucket Size Duration (BSD), (4) Packet Delay Budget. A Logical Channel Configuration (LCC) for a given radio bearer (including for example any of the parameters (e.g., allowedSCS-List, maxPUSCH-Duration, configuredGrantType1Allowed, allowedServingCells, and/or allowedCG-List, among others) may relate to a desired level of QoS for the flow or flows applicable to the radio bearer. The WTRU may perform a first pass where the WTRU may serve as many of the applicable radio bearers (e.g., at least radio bearers with non-zero amounts of data available for transmission) as possible. The WTRU may fill the available space in a TB in decreasing order of absolute priority and up to the PBR for the radio. If available space in the TB remains for more data, the WTRU may perform a second pass where the WTRU may serve as much data as possible for applicable radio bearers again in absolute decreasing priority order. The data may be inserted in the TB using appropriate fields and/or syntax for identification of the logical channel associated with the data.

Representative Procedures for Sidelink Relaying

Relaying (e.g., sidelink relaying) may include the use of both WTRU to network relays and WTRU to WTRU relays based on a PC5 link (e.g., a sidelink). Sidelink can support V2X related road safety services via, broadcast, groupcast and/or unicast communications in both out-of-coverage and in-network coverage scenarios. Sidelink-based relaying functionality may be implemented for sidelink/network coverage extension and/or power efficiency improvement, for example to enable a wider range of applications and/or services. WTRU-to-network coverage extension and/or WTRU-to-WTRU coverage extension may include multihop relay and may implement relay selection/reselection, QoS, and/or service continuity, among others.

AI Implementation Challenges

AI may be used/implemented in a communication system, or within a communication protocol stack and may create associated challenges including any of:

(1) processing complexity (for example less processing complexity may occur with a single AI/ML model than with multiple AI/ML models. Processing requirements and training complexity does not scale well with an increasing number of separately trained model within the same device. The implementation and processing complexity of e.g., smaller, separate AI blocks is larger than that of e.g., a single larger separate AI block); and/or (2) predictability, network control and/or interoperability of AI/ML operating over a wireless interface (for example, by enabling usage of AI-based components in a manner that is controllable with a network device and/or that is consistent across different terminal devices, across different verticals, across different deployments and across different connectivity paradigms without specifying a single trained model across all vendor implementations and/or without having to upload a new model at every change of a communication node of the air interface).

In certain representative embodiments, methods, apparatus, procedures, operations and functions may be implemented as enablers for inserting and controlling AI-filters in a coordinated manner between nodes. Representative embodiments, for example, may enable a configurable, variable number of L1, L2 and/or L3 functions. The functions may be cascaded or not cascaded and may be in a protocol/processing chain of one or more functions. The functions may be implemented using one or more AI-based modules. In certain examples, the enablers may be controlled semi-statically and/or dynamically by a network entity (e.g., via network signaling).

Representative Procedures/Operations for AI-Based Filters in Communication Protocols The procedures/operations described herein are applicable, without limitation to, any communication link that include two communication devices (e.g., point-to-point communications) and/or more than two communications devices (e.g., point-to-multipoint communications) such as 3GPP LTE Uu, 3GPP NR Uu, 3GPP Sidelink, and/or IEEE Wifi technologies, among others including protocols for wireless air interfaces and device-to-device communications.

The term 'rule-based' component or components can refer to specified WTRU behaviors and/or requirements explicitly defined in the form of procedural text, signaling syntax or the like. For example, an LCP procedure may be defined as a sequence of procedural operations, for example in a standard (for example, in a 3GPP MAC specification, e.g., TS 38.321).

Representative Procedures for High-Level
Description of AI Component

Procedures are described herein to enable a system and/or apparatus in which a communication protocol may be configured as a chain of functions. The chain of functions may be configured within a processing path of a layer, and may be modeled as a processing block and/or a plurality of processing blocks, cascaded or not cascaded. Each processing block may be configured as a rule-based function (e.g., as a legacy function) or as an AI component (e.g. an AI filter). In some embodiments, the configuration within a protocol layer function may be a combination of a rule-based part and an AI filter part. Each part may have a specified input and output. For example, a WTRU may be configured with an AI filter using a model that (e.g., may be trained to recognize per-packet flow treatment). For example, the AI filter may be configured by: (1) an application layer, (2) a NAS protocol (e.g., the AI filter may be configured with other QoS filters such as for flow mapping), (3) RRC signaling (for example, the AI filter may be configured (i) per radio bearer (e.g., DRB and/or SRB), (ii) per cell, (iii) per type of channel access, and/or (iv) per MAC instance, among others), (4) SDAP, (5) MAC signaling and/or (6) L1/PDCCH signaling (e.g., dynamic change or control of the applicable filter for a given uplink grant), among others. For example, the AI filter may use a sequential modeling that dynamically tracks at a fine granularity the per-packet prioritization for one or more services as a function of: (1) changing radio conditions, (2) radio access type (e.g., licensed and/or unlicensed, among others), (3) physical layer resources (e.g., (i) in time, (ii) frequency/subcarriers, (iii) bandwidth, (iv) inter-carrier spacing, (v) symbol duration such as for tracking maximum data rates, (vi) latency and/or (vii) maximum delay guarantees), (4) data rates, (5) jitter, (6) latency, and/or (7) contents of a PDU among others. The WTRU may be configured to default to a rule-based function (e.g., such as a legacy definition for standardized procedural behavior and a set of WTRU requirements).

Representative Principle of Operation as a Mechanism/Means to Initiate, Introduce and/or Control AI (e.g., and/or the Extent of AI) within the Protocol/Operations A protocol layer may be defined/set/configured using one or more processing blocks. One, a subset or each processing block may have one or more defined/configured/specified inputs and one or more defined/configured/specified outputs. Herein a processing block may be implemented as a rule-based operation or using an AI component. In some examples, the processing block may be dynamically configured to be rule-based, or AI component based (for example in accordance with one or more parameters, and/or control signaling, among others). For example, the AI component behavior may be affected by training data. The behavior of the AI component and/or its parameterization may be impacted by any of (1) a network configuration, (2) a WTRU implementation, (3) an application configuration and/or (4) a default/reference AI model configuration. The AI component may be configurable to achieve different levels of performance (e.g. with configurable processing complexity, accuracy, power consumption, and/or granularity, among others).

A function associated with a protocol layer may be implemented by one processing block and/or a cascading set of more than one processing blocks. One, a subset or each processing block may implement a specific sub-task. In some examples, the cascading processing blocks may include assembling standalone processing blocks (e.g., piecing together various processing blocks) e.g., in a sort of interlocking ('Lego' like) arbitrary pattern. The cascading of processing blocks may provide a framework to introduce/configure/initiate learning based algorithms into RAN protocols, without compromising interoperability, while conforming to a standardized signaling and standardized behaviors. The learning based algorithms may achieve the benefits of machine learning. This framework may enable the learning based functions to co-exist with counterpart rule-based functions (e.g., to enable specific specialized tasks and/or to achieve a phased introduction of machine learning into a system/apparatus).

In certain representative embodiments, the amount of AI (e.g., how much AI) that may be used in a protocol may be configurable, for example based on a maturity of machine learning model and/or availability of training data, among others.

The cascading of processing blocks, for example may enable flexible partitioning of WTRU processing between various flows: (1) for (e.g., dedicated processing blocks for high priority vs shared processing blocks for lower priority and/or for other conditions), (2) for (e.g., high performant processing blocks (for example to achieve better accuracy and/or granularity), and/or (3) for critical flows vs acceptable performant processing blocks for best effort, among others.

The cascading of processing blocks may enable flexible partitioning of WTRU hardware processing between various protocol functions for hardware limited devices such as Internet of Things (IoT) devices (for example, a WTRU or other wireless device may have limited hardware resources to store/train/perform inference using AI components. By cascading different processing blocks with different characteristics (e.g., one or more large AI components, one or more small AI components, and/or one or more rule-based component, among others), it is contemplated that specific RAN functions given a WTRU capability may be implemented. The partitioning of such components (AI and non-AI components) may be dynamic based on one or more factors including any of: (1) the active flows (the corresponding QoSs used/required), and/or (2) WTRU power saving state, among others.

The cascading of processing blocks may enable on-the-fly dynamic function setting/realization. One, a subset or each processing block may be equivalent to a low level representation of a sub-task. The cascading of processing blocks may be used to implement/realize a higher level of abstraction/function.

The cascading of processing blocks may enable flexible tradeoff between optimizing power consumption and optimizing performance. For example, a WTRU may be configured to configure/rearrange/reconfigure the processing blocks as a function of power saving state of the WTRU.

In one embodiment, the WTRU may determine, based on the INPUT, OUTPUT parameters associated with an AI filter, an entry point of an AI filter within a processing chain. For example, if one of the inputs is "RLC PDU" then the WTRU may determine that the AI filter may operate at the Service Access Point (SAP) between the RLC and the MAC layer, for example, which may correspond to the entry point of the MAC multiplexing function. For example, if one of the inputs is a set of applicable logical channels, or a type of logical channel, the WTRU may determine that a subset of the SAPs (e.g., only a subset of the SAPs) is applicable for the concerned filter (e.g., AI filter). For example, if one of the outputs is a MAC PDU, the WTRU may determine that the AI filter may operate at the SAP between the MAC and the PHY layer, for example which may correspond to an exit point of the MAC multiplexing function. For example, if additionally, one of the inputs includes a HARQ processing configuration, the WTRU may determine that the AI filter may additionally include HARQ processing functions.

Representative Procedures Using Contextual AI Components

The availability of an AI filter, the configuration or configurations of the AI filter and/or the use of the AI filter may be determined as a function of a context.

For network-based control of AI filter selection, the WTRU may receive signaling that may update the active filter, by receiving an updated filter, receiving a configuration, receiving a model for the AI component and/or receiving an indication of an AI filter configuration and/or model to apply for the AI component.

For WTRU-based AI filter selection, the WTRU may be configured to determine the applicable AI filter. In certain embodiments, the WTRU may be configured with a plurality of AI components. Such AI component may correspond to a given function of a protocol layer and/or to a portion of the processing chain. One, a subset or each AI component may be trained and/or associated with a specific context. The context may be associated with; (1) one or more specific link conditions (e.g., one or more RSRP values, one or more RSRQ values, and/or one or more SINR values or a range thereof), (2) one or more specific peer AI components (e.g., associated with a gNB/network entity, a CU and/or a logical area), (3) one or more specific channel types (e.g., Umi, Uma, indoor, and/or outdoor, among others), (4) one or more specific WTRU states (e.g., a RRC state, a L2 protocol state/configuration, and/or a power saving state or a combination thereof), (5) one or more specific QoS characteristics/requirements (e.g., for eMBB, for URLLC, and/or for mMTC or a combination thereof), (6) one or more specific versions (e.g., different releases), (6) one or more specific capabilities (e.g., a processing capability, size of the neural network (NN) supported, etc.), (7) a specific frequency range and/or (9) a specific type of access (e.g., licensed, and/or unlicensed spectrum). For example, during a change of context, the WTRU may be configured to use a specific AI component which may be selected/determined based on any of: (1) implicitly based on new context, (2) signaled explicitly (e.g., explicitly indicated by the network (e.g., a network entity/gNB, and/or (3) a default/preconfigured behavior (e.g., and may be reset to an initial and/or a default state unless the signaling indicates to "continue").

Representative Signaling Associated with the Acquisition of an AI Filter

FIG. 2 is a diagram illustrating a representative procedure for updating an AI model (e.g., to incrementally update an AI model).

Referring to FIG. 2, the representative procedure 200 may include, for example, a WTRU 120 receiving or obtaining information 220 to perform default functionality using the AI model 210 (e.g., an AI filter (e.g., AI filter 320-1, 320-2 and/or 320-3) may implement weights and biases associated with nodes of a neural network to implement the AI model 210 (e.g., an AI model with default functionality). For example, the AI model 210 may be predefined and/or preconfigured by the manufacturer or may be configured in an initial setup procedure.

The AI model 210 may be updated (e.g., incrementally updated) via a broadcasted signal/information 230 to a set of WTRUs (e.g., WTRUs 102A and 102B). The broadcast may provide an AI model 210 with a new functionality or an AI model 210 with the same functionality, but more or less granularity than the default functionality.

In lieu of or in addition to the broadcasted signal/information 220, the AI model 210 may be updated (e.g., incrementally updated) via a dedicated signal/information 240 (e.g., an RRC signal) to the WTRU (e.g., the WTRU 102A). The dedicated signal/information may provide the AI model 210 with a new functionality or the AI model 210 with the same functionality, but more or less granularity than the default functionality. The dedicated signaling/information may enable a functionality for the AI model that is different from and/or unique to that of AI models 210 of other WTRUs 102B and/or 102C.

In certain embodiments, the WTRU 102A may receive an AI filter configuration via unicast RRC signaling, for example, as a part of RRC reconfiguration procedure. For example, the WTRU 102A may indicate the capabilities of the WTRU 102A in terms of any of: (1) storage availability, (2) support of various AI filter architectures, (3) parameterizations, and/or (4) processing latency, among others. The WTRU capability may be indicated as a part of a RRC connection request and/or any other RRC message. The WTRU 102A may receive in a RRC connection setup or RRC reconfiguration, the configuration associated with one or more AI filters 320. For example, the WTRU 102A may be configured to activate the AI filter 320, when the RRC reconfiguration is applied. In another example, the WTRU 102A may be configured to activate the AI filter 320 upon or after an activation command via MAC control element (MAC CE), DCI, or the like.

In certain representative embodiments, a WTRU 102A may receive an AI filter 320 or an indication to apply the AI filter 320 from a broadcast (for example the WTRU 102A may receive an indication from the SIB about the presence of one or more AI filters 320). The WTRU 102A may be configured to request a configuration for a specific AI filter 320-1 (for example based on a specific context and/or based on the WTRU capability). In some examples, the WTRU 102A may be configured to make/generate/send such a request using an on-demand SIB request procedure. In certain examples, the WTRU 102A may make/generate/send such a request in a RRC connection request procedure. The AI filters 320 may be configured to be active or inactive by default. If an AI filter 320 is configured to be inactive, a subsequent activation command may be signaled in a MAC CE or DCI or the like. In certain embodiments, the activation or deactivation of the AI filter 320 may be based on group signaling. For example, the WTRU 102A may be configured to monitor a control message indicating for the WTRU 102A to activate/deactivate AI filters 320. The control message may be addressed to the WTRU 102A itself, to a group of WTRUs 102A, 102B and 102C or to all the WTRUs 102 in a cell.

In representative embodiments, a WTRU 102 may receive an AI filter configuration and/or learned parameters (e.g., a model transfer) via a multicast RRC signaling. For example, the WTRU 102 may process and/or may apply a multicast RRC signaling which may reconfigure at least one aspect of the AI filter 320. For example, the RRC signaling may correspond to a RRC reconfiguration procedure. The WTRU 102 may receive the multicast RRC signaling on a service radio bearer (e.g. the SRB0) with a preconfigured security context, which may be the same security context or a different security context from a unicast security context. The WTRU 102 may be configured to indicate successful reconfiguration of the AI filter 320 using a RRC reconfiguration complete message, for example if (e.g., only if) explicitly requested. The WTRU 102 may be configured to indicate successful reconfiguration of a signaling radio bearer with a preconfigured security context including NULL. The WTRU 102 may be configured to monitor a RNTI specific to multicast signaling.

The configuration related to the AI filter 320 may include, but is not limited to, (1) a configured set of IN PUTs and preprocessing thereof, (2) a set of hyperparameters involving both the model structure and the training, learned parameters (e.g. weights and/or biases) and (3) a configured set out of OUTPUTs and postprocessing thereof. In certain examples, the configuration of the INPUT/OUTPUT parameters may implicitly indicate a placement of the AI filter 320 within a processing chain of the WTRU 102 or protocol layer.

Representative Procedures for Incremental Activation/Update of AI Filters

A WTRU may be configured to update the learned parameters based on one or more signaling procedures/methods described herein. For example, the WTRU may be configured to update the AI filter after or upon receiving the learned parameters (e.g., all the learned parameters). In another example, the WTRU may be configured to update the AI filter incrementally, (e.g., as soon as or after receiving any learned parameters). For example, an AI filter may be composed of or may include a plurality of layers. One, a subset or each layer may consist of or include a plurality of neurons and a preconfigured connectivity between neurons of adjacent layers and for example, the WTRU may receive learned parameter grouped into different layers. In certain embodiments, the WTRU may apply the learned parameter layer, as soon as all the weights for a specific layer are received. In other embodiments, the WTRU may be configured to receive the learned parameter grouped into a subset of connections (e.g., high priority/important connections) within the AI filter. For example, the WTRU may be configured to apply the learned parameters at a granularity of each connection (e.g., a per connection granularity) or a group thereof as soon as they are received, after all are received, or with a predetermined or signaled delay period.

Representative Procedures for Dynamic Forwarding Using AI Filters

FIG. 3 is a diagram illustrating a representative procedure for dynamic forwarding/relaying using an AI filter.

Referring to FIG. 3, in the representative procedure 300, for example a base station 114 or gNB 180 may send a message (e.g., a plurality of packets) to a first WTRU 102A. The first WTRU 102A may include one or a plurality of AI filters 320-1, 320-2 and 320-3. The first WTRU 102A may select one of the AI filter 320-2 to perform operations associated with packet forwarding and/or packet relaying or may train one of the AI filters 320-2 to perform operations associated with packet forwarding and/or packet relaying. The first WTRU 102A may use one or more of the packets, one or more packet headers or parts thereof, as an input 310 to the AI filter 320-2. The first WTRU 102A may also use other information, as the input 310 to the AI filter 320-2, including link condition information and/or contextual information, among others. The AI filter 320-2 may output a first output 330-1 and/or a second output 330-2, as: (1) one or more AI determined packets; and/or (2) one or more parameters/information (e.g., any of: one or more transmission profile parameters/information, one or more next hop parameters/information, one of more sidelink resources/parameters/information, and/or one or more link adaptation parameters/information, among others) which are associated with the inputted packets. The first output 330-1 may be an AI determined packet for forwarding/relaying to a second WTRU 102B and a second output 330-2 may be an AI determined packet for forwarding to a third WTRU 102C. In certain representative embodiments, the output of the AI filter 320-3 may provide information/parameters via an interface to rule-based logic of the first WTRU 102A to enable the rule based logic of the first WTRU 102A to perform the appropriate packet forwarding/relaying to other WTRUs 102B and/or 102C. One of skill understands that packet forwarding/relay may be performed using AI determined parameters.

In certain examples, the WTRU may be configured with AI filters for dynamic forwarding (e.g., in a relaying context). The WTRU may determine that a downlink and/or sidelink transmission is received using a first set of resources. The WTRU may determine that an AI filter is configured/activated (e.g., for the purpose of data forwarding and/or for processing of the received data, for example from a specific set of physical resources). The WTRU may pass the received transmission (for example without preprocessing or after some pre-processing) to the AI component for classification. The AI component may output for example: (1) whether or not the received data is for the WTRU itself, (2) the set of resources (e.g., the specific set of physical resources), and/or (3) transmission parameters to use for forwarding the received data (e.g., forwarding by transmission of uplink data or sidelink data using a second set of resources). The output may also include any of: (1) power settings, (2) channel coding, (3) control information to transmit along with the forwarded data, and/or (4) scrambling applied to the data, or the like. The AI component may perform (and thus may replace the rule-based specifications) for at least part of the forwarding information and/or lookup processing, reception of control information for scheduling (e.g., in time, frequency, pool of resources and/or addressing), determination of a security context and/or application of security/encryption/integrity protection.

In certain examples, a WTRU may be configured to operate in a sidelink relay mode. At least one function may be configured based on an AI filter. For example, one or more chains (e.g., of functions) within the processing path of PDU forwarding may be enabled based on an AI filter configuration. The AI filter may be an option, instead of a rule-based component or in addition to a rule based component. The WTRU, based on network control, may be configured to use an OEM filter, an application based filter, a network configured filter and/or a default rule-based component, among others. In some embodiments, activation of an AI filter (e.g., an AI based component) may trigger deactivation of a rule-based component.

An AI filter may be characterized by a specified set of INPUTs, a set of hyperparameters, a set of learned parameters and/or a specified set of OUTPUTs. The hyperparameters may include information about any of: the type of AI component, the architecture of the AI component, details of the AI component structure, a learning rate, a minibatch size, epochs, dropout, regularization, and/or an optimization algorithm, among others. The learned parameters may be weights/biases. The WTRU may receive signaling that indicates an entry point of the AI filter, initial values/parametrization and an exit point of the AI filter. The AI filter may be a configuration aspect of the WTRU.

In certain examples, the PDU forwarding may be enabled over a multi-hop sidelink and/or Uu link. The configuration of the AI filter, for example the input and/or output configuration may enable flexible insertion of AI logic within the chaining of functions associated with the PDU forwarding. For example, the input to the AI filter may be an SDAP PDU, an PDCP PDU, a RLC PDU, and/or a MAC PDU, among others. The output of the AI filter may determine forwarding rules implicitly or explicitly based on a selection and/or determination using one or more tables of resources (e.g., lookup tables). The resources in the tables may include: RNTIs, a set of PRBs (time/frequency resource blocks), scrambling and/or any methods/procedures/operations specific to sidelink transmissions that implies addressing, link adaptation and/or resource allocation).

Representative AI Filter Operation

The AI filter may include a component that performs a classification task. The classification task may involve predicting which class a given input belongs to. The different classes may be configured to be N different groups/pools of sidelink resource. The different classes may be configured to be N different logical channels. The different classes may be configured to be N different next hop receivers. The classification task may be arranged such that, given a PDU or a header thereof and/or optionally channel quality related information, as input, the AI filter may output one of the N classes. In some examples, the AI filter may be configured to perform a multiclass classification such that the AI filter may output more than one possible class as the output. In certain examples, the AI filter may output N values corresponding to the N output classes. One, a subset or each of the values may indicate a probability of the input belonging to the specific class.

In one example, the AI filter may include a component that has an internal memory. The internal memory may correspond to weights and/or biases of an AI component. For example, the input to the AI filter may be a sequence of PDUs and/or associated information. The AI filter may incorporate sequence modelling, such that the output may be not only a function of current input, but may also be inputs/outputs generated at previous operations. The internal memory may hold the information in the form of weights and biases. The AI filter may consider the impact of the changes in (1) a channel, (2) a radio, (3) latency, (4) bitrate, and/or jitter (e.g., to determine how to apply QoS treatment on a per packet basis for a given flow), or the like. The determination may be used to select a next hop and/or one or more sidelink resources. For example, the determination may effect/influence the forwarding (e.g., forwarding procedures/operation/aspect).

Procedures for AI Filter Updates

In certain representative embodiments, the WTRU may be configured to update one or more procedures/operations/algorithms/aspects of the AI filter based on one or more trigger conditions. For example, the internal memory of the AI filter may be updated based on predefined/or signaled triggers. For example, the WTRU may be configured with a default value for the internal memory of the AI filter. A reset operation of the internal memory of the AI filter may result in the internal memory set to the default value. For example, the WTRU may be configured to reset the internal memory of the AI filter after/upon every K PDUs. The value of K may be predefined or signaled. As another example, the WTRU may be configured to reset the internal memory of the AI filter based on expiry of a timer. The value of the timer may be preconfigured or signaled. For example, the internal memory of the AI filter may be reset explicitly based on network signaling (e.g., via a network entity) (e.g., via RRC signaling, a MAC CE, DCI, or the like).

In certain representative embodiments, the WTRU may be configured to update the learned parameters of the AI filter. For example, the WTRU may receive the learned parameters from the network (e.g., a network entity). The learned parameters may overwrite (e.g., completely overwrite) the AI filter or certain parts of the AI filter. For example, the WTRU may receive instructions to reconfigure the inputs or the outputs of the AI filter.

For example, the WTRU may receive a command from the network (e.g., a network entity) to suspend or deactivate the AI filter and to fallback to a rule-based component (e.g., a default or specified rule-based component). In other examples, the WTRU may initiate the fallback after/upon a triggering event or triggering condition (e.g., a mobility event to a new gNB, a change in service type (e.g., to eMBB, to URLLC), a change in mode, and/or a change in relay status, among others).

Representative Procedures for a WTRU to Determine the Next Hop Based on AI Filter Output The AI filter may enable optimal forwarding rules. The AI filter may enable the network to encode complex forwarding rules in a simpler and processing efficient mechanism/operation/procedure. Using a PDU, the WTRU may be configured to determine a next hop based on service characteristics, for example determined based on PDU header fields. The forwarding rules may be enforced under the control of the gNB or other network entity using an AI filter configuration sent by the network.

For example, the WTRU may be configured to input to the AI filter the PDU header or one or more parts of the PDU header and may interpret the output of the filter as an indication associated with a next hop. The output may be an identity of the next hop. The WTRU may be configured to select the resources associated with the reception WTRU (e.g., at the next hop).

Representative Procedures for a WTRU to Determine Transmission Resources Based on AI Filter Output A WTRU may be configured to input to the AI filter, (1) a logical channel ID, (2) a PDU header and/or (3) one or more parts of the PDU header. The WTRU may be configured to interpret the filter output as an indication of resources applicable for transmission. In certain examples, the output of the AI filter may be any of: (1) an identifier of a resource pool configuration, (2) a start subchannel, (3) a number of subchannels, (4) a start time slot, (5) an offset time-slot, and/or (6) a periodicity of transmissions, among others.

Representative Procedures for a WTRU to Determine Logical Channels Applicable for Transmission Based on AI Filter Output A WTRU may be configured to input to the AI filter an identity associated with transmission resources and the output of the AI filter may be a set of logical channels applicable for transmission.

In certain examples, the WTRU may be configured to input to the AI filter a PDU header or parts of the PDU header and an identity of transmission resources. The output of the filter may be a Boolean value that indicates whether or not the PDU is applicable for transmission on the corresponding resource or resources.

Representative Association Between One or More Sidelink Resources and an AI Filter The WTRU may be configured with an association between sidelink resource and an AI filter. The AI filter is valid for a resource for a given WTRU (e.g., in a distributed sense). A change in sidelink resource or resources may implicitly indicate/mean a change in AI filter or vice versa. The WTRU may be configured to access the sidelink resource or resources for transmission based on the output of the AI filter. In certain examples, a WTRU may be configured with a plurality of AI filters and the association between the AI filter and the sidelink resource or resources may be configured semi-statically and/or may be dynamically controlled.

Representative Procedures for LCP Using AI Filters

The WTRU may be configured with one or more AI filters for LCP (e.g., to enforce more complex and/or low latency QoS management for uplink and/or sidelink transmissions). The WTRU may determine that the WTRU may perform a transmission. The WTRU may determine that an AI filter is configured/activated (e.g., for multiplexing of data in the transmissions). The WTRU may process the information associated with scheduling of the transmissions and may handle, for the logical channels using the AI filter for processing, which component is to output a MAC PDU (e.g., ready for HARQ processing) and may output a set of transmission parameters (e.g., a selection of the applicable scheduled resources). The AI component may perform (and thus may replace the rule-based components/specifications) for any of: (1) the multiplexing of data from different logical channels using a trained model (e.g., different than the legacy LCP prioritization), (2) the generation of MAC CEs, and/or (3) the selection of the applicable grant. The output may further include power settings, channel coding, uplink control information to transmit e.g., if the filter is configured to further cover additional processing beyond LCP, for example based on a configuration of the output parameters.

The WTRU may be configured with an AI filter using a model that may be trained to recognize per-packet flow treatment. For example, the AI filter may be configured by an application layer, by the NAS protocol (e.g., configured with other QoS filters such as for flow mapping), by RRC (e.g., configured per radio bearer DRB or SRB, per cell, per type of channel access, per MAC instance, etc.), by SDAP, by MAC signaling and/or by L1/PDCCH signaling (e.g., a dynamic change or control of the applicable filter for a given uplink grant). For example, the AI filter may use a sequential modeling that may dynamically track at a fine granularity the per-packet prioritization for one or more services as a function of changing radio conditions, data rates, jitter, latency, and/or contents of a PDU or the like.

Representative AI Filter Operations

The AI filter may take as an input any of: (1) a list of logical channel IDs, (2) an amount of data available for transmission in logical channels (e.g., each logical channel), (3) an UL grant size, and/or (4) meta information carried in the UL grant. The UL grant may include the meta information that may influence or does influence the behavior of the AI filter. The AI filter may be parameterized such that the AI filter includes a component that performs a regression task.

For example, the regression task may involve producing a number (e.g., a real number) given/based on a number of inputs. For LCP, the AI filter may generate a plurality of output values, one, a subset or each output value may correspond to an amount of data to be included in the transport block from a specific logical channel.

As other examples, the AI filter may include a component that has an internal memory. The internal memory may correspond to weights and/or biases of an AI component. The AI filter may incorporate sequence modelling, such that an output may not only be a function of a current input, but also may be inputs/outputs generated at previous operations. For example, the internal memory may hold information in a form of weights and biases. The AI filter may be configured such that the AI filter may learn a relative prioritization between logical channels. For example, the AI filter may be configured such that the AI filter may learn, for example to enforce any of: (1) a Prioritized Bit Rate (PRB), (2) a Bucket size, and/or (3) one or more logical channel restrictions, among others. The AI filter may store/buffer/remember an amount of data served from one, a subset or each logical channel during previous transmissions and may make new allocations such that the QoS can be ensured for one, some or each of the packet flows. The AI filter may enable the network to configure very granular WTRU behavior without a significant signaling overhead. The AI filter may consider/determine the impact of changes in channel/radio, changes in latency, bitrate, and/or jitter (e.g., for the purpose of a determination of how to apply a QoS treatment on a per packet basis for a given packet flow, or the like).

In certain representative embodiments, a WTRU may be configured with a plurality of AI filters. One, some or each filter may be associated with a context (refer to as a contextual AI component). The WTRU may select a specific AI filter based on a UL grant. For example, the UL grant may include meta information and the meta information may provide a logical identity of an AI filter. The meta information may also include contextual information. In certain examples, the meta information may be included in the UL grant that may provide an additional input to the AI filter operation. The meta information may reset the memory of the LCP. The meta information may temporarily adjust a behavior of the AI filter. The meta information may enable/disable certain layers, connections and/or neurons in the AI filter. The meta information may adapt the output dimension of the AI filter.

Representative Procedures for UL Grant Carrying an Indication of AI Filter

FIG. 4 is a diagram illustrating a representative procedure using an AI filter per packet QoS treatment.

Referring to FIG. 4, the representative procedure 400 may include that the WTRU 102 may be configured to determine an AI filter 320-1, 320-2 or 320-3 to apply for building a transport block 430 when the UL grant is received via a base station 114 and/or gNB 180. The WTRU 102 may be configured with multiple AI filters 320-1, 320-2 and 320-3. For example the WTRU 102 may determine/select the AI filter 320-3 based on an indication received in the UL grant. The UL grant may carry an identity associated with a preconfigured filter (for example the UL grant may indicate a reserved identity, after/upon which the WTRU may fall-back to a rule-based component. The UL grant may indicate a reserved identity, after/upon which the WTRU may fall-back to a default filter 320-1. The plurality of inputs 420-1, 420-2 and 420-3 may input to the selected AI filter 320-3. The inputs 420 may include, for example, any of: (1) one or more logical channel IDs (e.g., a list of logical channel IDs), (2) a PDU header, (3) one or more parts of the PDU header, (4) an amount of data available for transmission in logical channels (e.g., each logical channel), (5) an UL grant size, and/or (6) meta information (e.g., carried in the UL grant). The UL grant may include the meta information that may influence or does influence the behavior of the AI filter 320-3. The AI filter 320-3 may be parameterized such that the AI filter 320-3 includes a component that performs a regression task.

For example, the meta information may also include contextual information. In certain examples, the meta information may be included in the UL grant that may provide an additional input to the AI filter operation. The meta information may reset the memory of the LCP. The meta information may temporarily adjust a behavior of the AI filter. The meta information may enable/disable certain layers, connections and/or neurons in the AI filter 320-3. The meta information may adapt the output dimension of the AI filter 320-3.

In certain representative embodiments, a WTRU 102 may be configured to input to the AI filter 320, (1) one, a subset or each AI component may be trained and/or associated with a specific context. The context may be associated with; (1) one or more specific link conditions (e.g., one or more RSRP values, one or more RSRQ values, and/or one or more SINR values or a range thereof), (2) one or more specific peer AI components (e.g., associated with a gNB/network entity, a CU and/or a logical area), (3) one or more specific channel types (e.g., Umi, Uma, indoor, and/or outdoor, among others), (4) one or more specific WTRU states (e.g., a RRC state, a L2 protocol state/configuration, and/or a power saving state or a combination thereof), (5) one or more specific QoS characteristics/requirements (e.g., for eMBB, for URLLC, and/or for mMTC or a combination thereof), (6) one or more specific versions (e.g., different releases), (6) one or more specific capabilities (e.g., a processing capability, size of the neural network (NN) supported, etc.), (7) a specific frequency range and/or (9) a specific type of access (e.g., licensed, and/or unlicensed spectrum). The availability of an AI filter 320, the configuration or configurations of the AI filter 320 and/or the use of the AI filter 320 may be determined as a function of a context.

The AI filter 320-3 may determine: (1) a set of parameters (e.g., transmission parameters such as transmission profile parameters and/or link adaptation parameters, among others); and/or (2) a processed data unit (PDU) (e.g., a PDU applicable transmission post logical channel prioritization (LCP)) based on the output of the AI filter 320-3. The WTRU 102 may transmit the processed data unit using the set of parameters (e.g., outputted transmission parameters).

Representative AI Filter Associated with a Configured Grant

The WTRU may be configured with separate AI filters for one or more dynamic grants and/or one or more configured grants, for example there may be separate AI filters for each configured grant configuration.

FIG. 5 is a flowchart illustrating a representative method using one or more Artificial Intelligence (AI) filters.

Referring to FIG. 5, the representative method 500 may include, at block 510, that the WTRU 102 determines transmission resources and meta information associated with the transmission resources. At block 520, the WTRU 102 may determine a first AI filter 320-3 of the one or more AI filters 320 based on any of: the meta information associated with the transmission resources and/or contextual information. At block 530, the WTRU 102 may apply, as an input 420 to the first AI filter 320-3, information regarding at least one of: (1) one or more of the transmission resources, (2) link quality, (3) one or more logical channel identities, (4) the meta information associated with the transmission resources, and/or (5) one or more packet data unit (PDU) headers or a part thereof. At block 540, the WTRU 102 may obtain an output 430 of the first AI filter 320-3. At block 550, the WTRU 102 may obtain a set of AI-determined transmission parameters and/or one or more AI-determined processed data units based on the output of the first AI filter 320-3. At block 560, the WTRU 102 may transmit: (1) at least one AI-determined processed data unit or (1) a rule-determined processed data unit using at least one AI-determined transmission parameter.

In certain representative embodiments, the transmission resources may be scheduled transmission resources or configured transmission resources.

In certain representative embodiments, the contextual information may include information associated with any of: (1) historical channel conditions, (2) service mix, (3) temporal characteristics of PDUs in a buffer, and/or (4) available processing power at the WTRU 102.

In certain representative embodiments, the AI filter 320 may include a memory and the WTRU 102 may receive, from a network entity 180, 182, 183 or base station 114, a control signal to reset the memory. For example, the AI filter 320 may include the memory, and weights and biases. The WTRU 102 may receive, from the network entity 180, 182, 183 or base station 114, a control signal to reset the memory and the weight and biases to default values.

In certain representative embodiments, the WTRU 102 may include memory (e.g., removeable 130 and/or non-removeable memory 132) to store (1) an AI filter model 210 of the AI filter 320 using a plurality AI nodes, (2) a plurality of weights associated with the plurality of AI nodes of the AI filter 320, and/or (3) a plurality of biases associated with the plurality of AI nodes of the AI filter 320.

In certain representative embodiments, the WTRU 102 may apply or may further apply, as the input 310 or 420 to the AI filter 320 information regarding any one or more of: (1) one or more status of previous transmissions, and (2) one or more channel state conditions.

In certain representative embodiments, the WTRU 102 may receive information to configure the AI filter 320 via any of: a unicast transmission, a broadcast transmission and/or multicast transmission.

In certain representative embodiments, the WTRU 102 may receive information indicating to disable the AI filter 320 and may disable the AI filter based on the received information. For example, on condition that the AI filter 320 is disabled, the WTRU 102 may perform a corresponding rule-based processing operation in substitution for the disabled AI filter 320.

In certain representative embodiments, the AI filter 320 may include a neural network. For example, the WTRU 102 may receive information indicating a set of weights and/or biases to performing AI filtering. The WTRU 102 may train the AI filter 320 by setting the weighs and/or biases of each neural network node of the neural network based on the received information. In certain representative embodiments, the information may be received via a Media Access Control (MAC) Control Element (CE), or downlink control information (DCI) and may be used to configure the AI filter 320.

In certain representative embodiments, the WTRU 102 may performing AI-based Logical Channel Prioritization (LCP) using the AI filter 320; and may generate the AI-processed packet data unit in accordance with the AI-based LCP.

FIG. 6 is a flowchart illustrating a representative method implemented by a WTRU.

Referring to FIG. 6, the representative method 600 may include, at block 610, that the WTRU 102 receives a transmission on a first set of resources and the transmission may include at least one data unit. At block 620, the WTRU 102 may select an artificial intelligence (AI) filter 320-3 based on the first set of resources on which the transmission was received. At block 630, the WTRU 102 may apply, as an input 420 to the selected first AI filter 320-3, the data unit or a part thereof from the received transmission. At block 640, the WTRU 102 may determine any of: (1) a set of transmission parameters and/or (2) a processed data unit based on the output 430 of the AI filter 320-3. At block 650, the WTRU 102 may transmit the processed data unit using the determined transmission parameters.

FIG. 7 is a flowchart illustrating a representative method using an AI-enabled filter applicable for one or more functions.

Referring to FIG. 7, the representative method 700 may include, at block 710, that the WTRU 102 receives configuration information indicating a set of AI-enabled model parameters associated with the AI-enabled filter 320 applicable to a first function of the one or more applicable functions. For example, the configuration information may include interface information to interface the AI-enabled filter 320 to rule-based functions of the WTRU 102. At block 720, the WTRU 102 may configure the AI-enabled filter 320 to interface with the rule-based functions of the WTRU 102 in accordance with the interface information. At block 730, the WTRU 102 may activate the AI-enabled filter 320 based on a trigger condition.

In certain representative embodiments, the AI-enabled filter 320 may be preconfigured with a previously established function of the one or more applicable functions prior to the reception of the configuration information and the information indicating the set of AI-enabled model parameters may include incremental update information for the AI-enabled model parameters, for example to change a function of the AI-enabled filter from the previously established function to the first function.

In certain representative embodiments, the information indicating the set of AI-enabled model parameters may include information to set weighs and/or biases of nodes of a neural network associated with the AI-enabled filter 320.

In certain representative embodiments, the interface information may include any of: (1) an entry point of the AI-enabled filter with respect to rule-based functions of the WTRU; and/or (2) pre-processing information indicating pre-processing for one or more inputs to the AI-enabled filter 320.

In certain representative embodiments, the configuration information may be received via any of: a broadcast message/signal, a multicast message/signal or a unicast message/signal.

FIG. 8 is a flowchart illustrating another representative method implemented by a WTRU.

Referring to FIG. 8, the representative method 800 may include, at block 810, that the WTRU 102 receives a transmission on a first set of resources. For example, the transmission may include at least one data unit. At block 820, the WTRU 102 may select an AI filter 320 based on the first set of resources on which the transmission was received. At block 830, the WTRU 102 may input the data unit or a part of the data unit from the received transmission to the selected AI filter 320. At block 840, the WTRU 102 may perform AI filtering via the AI filter 320, on the inputted data unit or the inputted part of the data unit to output any of: a set of AI-based transmission parameters or an AI-processed data unit. For example, the AI-processed data unit may include one of: (1) a first portion of the data unit processed by the AI filter 320 and a second portion of the data unit processed by a rule-based component, or (2) the data unit processed by the AI filter 320. At block 850, the WTRU 102 may transmit any of: (1) the AI-processed data unit using a set of rule-based transmission parameters, or (2) a rule-based data unit using the AI-based transmission parameters.

In certain representative embodiments, the AI filter 320 may include a memory; and the WTRU 102 may receive, from a network entity 180, 182, 183 and/or 114, a control signal to reset the memory. For example, the AI filter 320 may include memory, and weights and biases. The WTRU may receive, from the network entity 180, 182, 183 and/or 114, the control signal to reset the memory and the weight and biases, for example to default values.

In certain representative embodiments, the AI filtering may include, as an input, information regarding any of: (1) one or more status of previous transmissions, and (2) one or more channel state conditions (e.g., historical channel state conditions).

In certain representative embodiments, the WTRU 102 may receive information to configure the AI filter 320 via any of: unicast message/transmission/signal, a broadcast message/transmission/signal and/or multicast message/transmission/signal.

In certain representative embodiments, the WTRU 102 may receive information indicating to disable the AI filtering; and may disable the AI filtering based on the received information. For example, the WTRU 102 may, on condition that the AI filtering is disabled, performing a corresponding rule-based processing operation in substitution for the disabled AI filtering. In certain representative embodiments, the AI filter 320 may include a neural network. For example, the WTRU 102 may receive information indicating a set of weights and/or biases to performing the AI filtering, and may train the AI filter 320 by setting the weighs and/or biases of each neural network node of the neural network based on the received information.

In certain representative embodiments, the WTRU 102 may receive information to configure the AI filter 320 via a Media Access Control Control Element (MAC CE), or downlink control information (DCI).

FIG. 9 is a flowchart illustrating a further representative method implemented by a WTRU.

Referring to FIG. 9, the representative method 900 may include, at block 910, that the WTRU 102 determines one or more scheduled or configured transmission resources and associated meta information, for example from control signaling. At block 920, the WTRU 102 may select, from a plurality of AI filters 320-1, 320-2 and 320-3, a first AI filter 320-3 based on the determined meta information. At block 930, the WTRU 102 may apply, as an input 420 (e.g., one or more inputs 420-1, 420-2 and/or 420-3, among others) to the first AI filter 320-3, any of: information associated with the transmission resources, logical channel identities, and/or packet data unit headers. At block 940, the WTRU 102 may determine a set of AI-based transmission parameters and an AI-processed packet data unit based on an output 430 of the AI filter 320-3. At block 950, the WTRU 102 may transmit, the AI-processed packet data unit using the AI-based transmission parameters.

In certain representative embodiments, the AI filter 320 may include memory and the WTRU 102 may receive, from a network entity 180, 182, 183 and/or 114, a control signal to reset the memory.

In certain representative embodiments, the AI filter 320 may include memory, and weights and biases and the WTRU 102 may receive, from a network entity 180, 182, 183 and/or 114, a control signal to reset the memory and the weight and biases, for example to default values.

In certain representative embodiments, the AI filter 320 includes, as an input, information regarding any of: (1) one or more status of previous transmissions, and (2) one or more channel state conditions (e.g., historical channel state conditions).

In certain representative embodiments, the WTRU 102 may perform AI-based LCP using the AI filter 320; and may generate the AI-processed packet data unit in accordance with the AI-based LCP.

In certain representative embodiments, the WTRU 102 may receive information to configure and/or train the AI filter 320 via one or more unicast, broadcast and/or multicast messages/transmissions/signals. In certain representative embodiments, the WTRU 102 may receive information indicating to disable the AI filter 320; and may disable the AI filter 320 based on the received information.

In certain representative embodiments, the WTRU 102 may, on condition that the AI filter is disabled, perform a corresponding rule-based processing operation in substitution for the disabled AI filter 320.

In certain representative embodiments, the AI filter 320 may include a neural network. For example, the WTRU 102 may receive information indicating a set of weights and/or biases to performing the AI filtering. The WTRU 102 may train the AI filter 320 by setting the weighs and/or biases of each neural network node of the neural network based on the received information.

In certain representative embodiments, the WTRU 102 may receiving information to configure the AI filter 320 via a Media Access Control Control Element (MAC CE), and/or downlink control information (DCI).

FIG. 10 is a flowchart illustrating and additional representative method implemented by a wireless transmit/receive unit (WTRU) that includes a processing chain to generate a processed packet data unit from a packet data unit using one or more AI filters.

Referring to FIG. 10, the representative method 1000 may include, at block 1010, that the WTRU 102 determines, based on information from a network entity 180, 182, 183 and/or 114, a location in the processing chain for an AI filter 320. At block 1020, the WTRU 102 may receive a transmission including a packet data unit. At block 1030, the WTRU 102 may perform AI filtering of the packet data unit, using an AI filter 320, to generate the processed packet data unit, as an AI-processed packet data unit. At block 1040, the WTRU 102 may send or forward the AI-processed packet data unit.

In certain representative embodiments, the AI filter 320 may include one or more preconfigured inputs and one or more preconfigured operations such that the AI filter 320 can be inserted into the processing chain at any of a plurality of locations in the processing chain including the determined location in the processing chain.

In certain representative embodiments, the AI-processed packet unit may be forwarded by the WTRU on a sidelink channel to another WTRU.

The hardware (e.g., a processor, GPU, or other hardware) and appropriate software may implement one or more neural networks (e.g., AI filters) having various architectures such as a perception neural network architecture, a feed forward neural network architecture, a radial basis network architecture, a deep feed forward neural network architecture, a recurrent neural network architecture, a long/short term memory neural network architecture, a gated recurrent unit neural network architecture, an autoencoder (AE) neural network architecture, a variation AE neural network architecture, a denoising AE neural network architecture, a sparse AE neural network architecture, a denoising neural network architecture, a sparse neural network architecture, a Markov chain neural network architecture, a Hopfield network neural network architecture, a Boltzmann machine (BM) neural network architecture, a restricted BM neural network architecture, a deep belief network neural network architecture, a deep convolutional network neural network architecture, a deconvolutional network architecture, a deep convolutional inverse graphics network k architecture, a generative adversarial network architecture, a liquid state machine neural network architecture, an extreme learning machine neural network architecture, an echo state network architecture, a deep residual network architecture, a Kohonen network architecture, a support vector machine neural network architecture, and a neural turning machine neural network architecture, among others. Each cell in the various architectures may be implemented as a backfed cell, an input cell, a noisy input cell, a hidden cell, a probabilistic hidden cell, a spiking hidden cell, an output cell, a match input output cell, a recurrent cell, a memory cell, a different memory cell, a kernel cell or a convolution/pool cell. Subsets of the cells of a neural network may form a plurality of layers. These neural networks may be manually trained or trained through an automated training process.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mate-able and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable storage medium as instructions for execution by a computer or processor to perform the actions described hereinabove. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU), the method comprising:
   determining transmission resources and meta information associated with the transmission resources;
   determining a first Artificial Intelligence (AI) filter from one or more AI filters based on the meta information associated with the transmission resources and contextual information;

receiving interface information indicating any of: (1) an entry point of the first AI filter, (2) initial values or parametrization for the first AI filter, and (3) an exit point of the first AI filter;
   based on the interface information, applying, as an input to the first AI filter, information regarding: (1) one or more of the determined transmission resources, (2) the meta information associated with the transmission resources, and (3) one or more packet data unit (PDU) headers or a portion of the PDU headers;
   obtaining an output of the first AI filter;
   obtaining, based on the output of the first AI filter, any of (1) a set of AI-determined transmission parameters or (2) one or more AI-determined processed data units; and
   transmitting: (1) at least one of the AI-determined processed data units or (2) a rule-determined processed data unit, using at least one of the AI-determined transmission parameters.

2. The method of claim 1, wherein the transmission resources are scheduled transmission resources or configured transmission resources.

3. The method of claim 1, wherein the contextual information includes information associated with any of: (1) historical channel conditions, (2) service mix, (3) temporal characteristics of PDUs in a buffer, and/or (4) available processing power at the WTRU.

4. The method of claim 1, wherein:
   the AI filter includes a memory; and
   the method further comprises receiving, from a network entity, a control signal to reset the memory.

5. The method of claim 1, wherein:
   the AI filter includes a memory to store values associated with weights and biases; and
   the method further comprising receiving, from a network entity, a control signal to reset the memory to restore values of the weights and biases to default values.

6. The method of claim 1, wherein:
   the AI filter uses a plurality of AI nodes; and
   the WTRU includes a memory to store (1) an AI filter model of the AI filter, (2) a plurality of weight values associated with the plurality of AI nodes of the AI filter, and (3) a plurality of bias values associated with the plurality of AI nodes of the AI filter.

7. The method of claim 1, wherein the input applied to the AI filter includes information regarding any one or more of: (1) one or more statuses of previous transmissions, and (2) one or more historical channel state conditions.

8. The method of claim 1, further comprising receiving information to configure the AI filter via any of: a unicast transmission, a broadcast transmission and/or multicast transmission.

9. The method of claim 1, further comprising:
   receiving information indicating to disable the AI filter; and
   disabling the AI filter based on the received information.

10. The method of claim 9, further comprising, on condition that the AI filter is disabled, performing a corresponding rule-based processing operation in substitution for the disabled AI filter.

11. The method of claim 1, wherein:
   the AI filter includes a neural network; and
   the method further comprises:
      receiving information indicating a set of weights and/or biases to performing AI filtering, and training the AI filter by setting the weights and/or biases of each neural network node of the neural network based on the received information.

12. The method of claim 1, further comprising receiving information to configure the AI filter via a Media Access Control (MAC) Control Element (CE), or downlink control information (DCI).

13. The method of claim 1, further comprising:

performing AI-based Logical Channel Prioritization (LCP) using the AI filter; and generating the AI-processed packet data unit in accordance with the AI-based LCP.

14. A wireless transmit/receive unit (WTRU), comprising:

circuitry, including any of a processor and a transmit/receive unit, configured to:

determine transmission resources and meta information associated with the transmission resources, determine a first Artificial Intelligence (AI) filter from one or more AI filters based on the meta information associated with the transmission resources and contextual information, receive interface information indicating any of: (1) an entry point of the first AI filter, (2) initial values or parametrization for the first AI filter, and (3) an exit point of the first AI filter;

based on the interface information, apply, as an input to the first AI filter, information regarding: (1) one or more of the determined transmission resources, (2) the meta information associated with the transmission resources, and (3) one or more packet data unit (PDU) headers or a portion of the PDU headers, obtain an output of the first AI filter, and obtain, based on the output of the first AI filter, any of (1) a set of AI-determined transmission parameters or (2) one or more AI-determined processed data units; and transmit: (1) at least one of the AI-determined processed data units or (2) a rule-determined processed data unit, using at least one of the AI-determined transmission parameters.

15. The WTRU of claim 14, wherein the transmission resources are scheduled transmission resources or configured transmission resources.

16. The WTRU of claim 14, wherein the contextual information includes information associated with any of: (1) historical channel conditions, (2) service mix, (3) temporal characteristics of PDUs in a buffer, and/or (4) available processing power at the WTRU.

17. The WTRU of claim 14, wherein:

the AI filter includes a memory; and the transmit/receive unit is configured to receive, from a network entity, a control signal to reset the memory.

18. The WTRU of claim 14, wherein:

the AI filter includes memory to store values associated with weights and biases; and the transmit/receive unit is configured to receive, from a network entity, a control signal to reset the memory to restore values of the weights and biases to default values.

19. The WTRU of claim 14, wherein the AI filter uses a plurality AI nodes, wherein the WTRU further comprises a memory to store (1) an AI filter model of the AI filter, (2) a plurality of weight values associated with the plurality of AI nodes of the AI filter, and (3) a plurality of bias values associated with the plurality of AI nodes of the AI filter.

20. The WTRU of claim 14, wherein the input applied to the AI filter further includes information regarding any one or more of: (1) one or more statuses of previous transmissions, and (2) one or more historical channel state conditions.

21. The WTRU of claim 14, wherein the transmit/receive unit is configured to receive information to configure the AI filter via any of: a unicast transmission, a broadcast transmission and/or a multicast transmission.

22. The WTRU of claim 14, wherein:

the transmit/receive unit is configured to receive information indicating to disable the AI filter; and the processor is configured to disable the AI filter based on the received information.

23. The WTRU of claim 22, wherein the processor is configured to perform, on condition that the AI filter is disabled, a corresponding rule-based processing operation in substitution for the disabled AI filter.

24. The WTRU of claim 14, wherein:

the AI filter includes a neural network; and the transmit/receive unit is configured to receive information indicating a set of weights and/or biases to perform AI filtering, and the processor is configured to train the AI filter by setting the weights and/or biases of each neural network node of the neural network based on the received information.

25. The WTRU of claim 14, wherein the transmit/receive unit is configured to receive information to configure the AI filter via a Media Access Control (MAC) Control Element (CE), or downlink control information (DCI).

26. The WTRU of claim 14, wherein the processor is configured to:

perform AI-based Logical Channel Prioritization (LCP) using the AI filter; and generate the AI-processed packet data unit in accordance with the AI-based LCP.

27. The method of claim 1, wherein the input to the first AI filter further comprises information regarding any of: link quality and one or more logical channel identities.

28. The WTRU of claim 14, wherein the input to the first AI filter further comprises information regarding any of: link quality and one or more logical channel identities.

\* \* \* \* \*